United States Patent
Shiga et al.

(10) Patent No.: US 7,262,526 B2
(45) Date of Patent: Aug. 28, 2007

(54) ROTOR FOR PERMANENT MAGNET MOTOR OF OUTER ROTOR TYPE

(75) Inventors: Tsuyoshi Shiga, Nagoya (JP); Masami Hattori, Kasugai (JP)

(73) Assignees: Kabushiki Kaisha Toshiba, Tokyo (JP); Toshiba Ha Products Co., Ltd., Osaka (JP); Toshiba Consumer Marketing Corporation, Tokyo (JP)

( * ) Notice: Subject to any disclaimer, the term of this patent is extended or adjusted under 35 U.S.C. 154(b) by 0 days.

(21) Appl. No.: 10/518,367

(22) PCT Filed: Jun. 16, 2003

(86) PCT No.: PCT/JP03/07631

§ 371 (c)(1),
(2), (4) Date: Nov. 18, 2005

(87) PCT Pub. No.: WO04/001930

PCT Pub. Date: Dec. 31, 2003

(65) Prior Publication Data

US 2006/0103253 A1 May 18, 2006

(30) Foreign Application Priority Data

Jun. 20, 2002 (JP) ............................. 2002-179785
Oct. 25, 2002 (JP) ............................. 2002-310967

(51) Int. Cl.
*H02K 5/02* (2006.01)
*H02K 21/12* (2006.01)

(52) U.S. Cl. .................. 310/43; 310/217; 310/218; 310/156.28; 310/156.29; 310/156.39; 310/156.53; 310/156.56

(58) Field of Classification Search .................. 310/43, 310/216–217, 156.08, 156.15, 156.28, 156.29, 310/156.53, 156.56, 156.38, 156.39; 360/97.1–99.12
See application file for complete search history.

(56) References Cited

U.S. PATENT DOCUMENTS

| | | | |
|---|---|---|---|
| 2,963,599 A | | 12/1960 | Gayler |
| 5,767,601 A | * | 6/1998 | Uchiyama .................. 310/190 |
| 5,907,206 A | | 5/1999 | Shiga et al. |

(Continued)

FOREIGN PATENT DOCUMENTS

DE 1093000 B 11/1960

(Continued)

*Primary Examiner*—Tran Nguyen
(74) *Attorney, Agent, or Firm*—Pillsbury Winthrop Shaw Pittman, LLP

(57) ABSTRACT

A rotor for a permanent magnet motor of an outer rotor type having a plurality of permanent magnets and disposed around a stator includes a frame, an annular iron core combined integrally with the frame, and a plurality of insertion holes formed in the core so that the permanent magnets are inserted in the insertion holes respectively. The frame, the core and the permanent magnets are combined integrally with one another by a synthetic resin. Each insertion hole includes a magnet disposing portion in which the permanent magnet is disposed, a space portion located in at least one of circumferential both ends of each permanent magnet disposed in the magnet disposing portion, and a positioning portion positioning each permanent magnet in the magnet disposing portion, and the molten synthetic resin is poured into the space portion.

7 Claims, 12 Drawing Sheets

U.S. PATENT DOCUMENTS

| | | | |
|---|---|---|---|
| 5,920,139 A * | 7/1999 | Fujiwara et al. | 310/154.11 |
| 5,929,547 A * | 7/1999 | Kim | 310/156.53 |
| 5,962,944 A * | 10/1999 | Narita et al. | 310/156.53 |
| 6,093,984 A * | 7/2000 | Shiga et al. | 310/26 |
| 6,369,478 B1 | 4/2002 | Koharagi et al. | |
| 6,396,177 B1 * | 5/2002 | Shin et al. | 310/63 |
| 6,492,756 B1 * | 12/2002 | Maslov et al. | 310/156.12 |
| 6,657,328 B2 * | 12/2003 | Shiga et al. | 310/26 |
| 6,727,632 B2 * | 4/2004 | Kusase | 310/266 |

FOREIGN PATENT DOCUMENTS

| | | |
|---|---|---|
| DE | 4418454 A1 | 11/1995 |
| JP | 10094203 | 4/1998 |
| JP | 2000-166142 A | 6/2000 |
| JP | 2002-10602 A | 1/2002 |
| JP | 2002-233122 | 8/2002 |
| WO | WO 02/052698 A | 7/2002 |

* cited by examiner

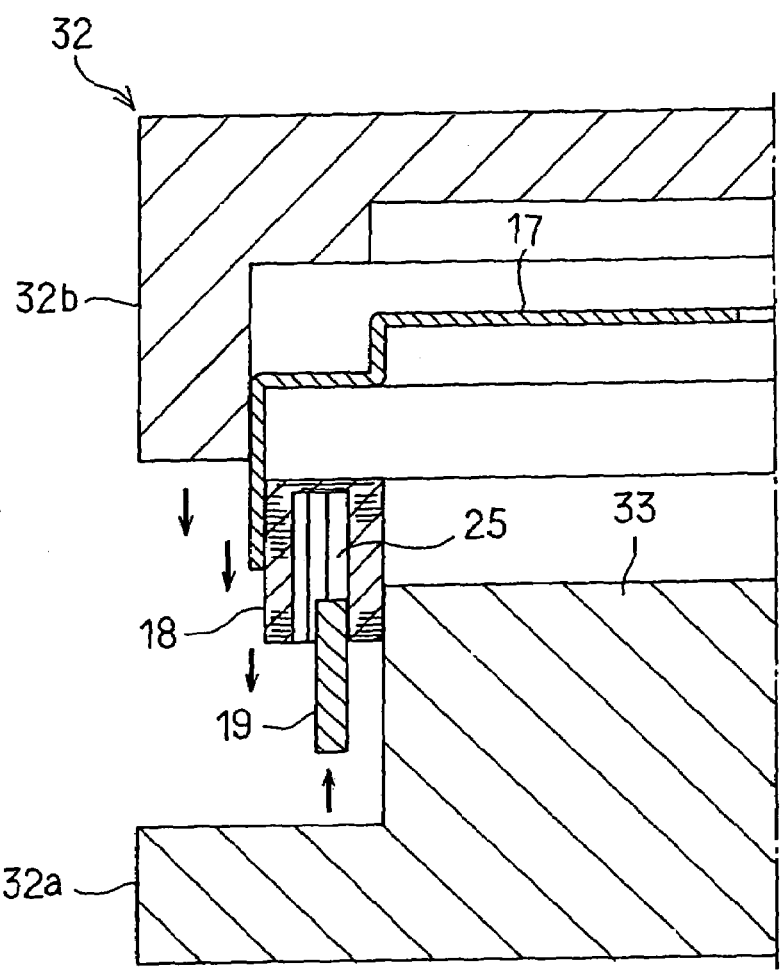
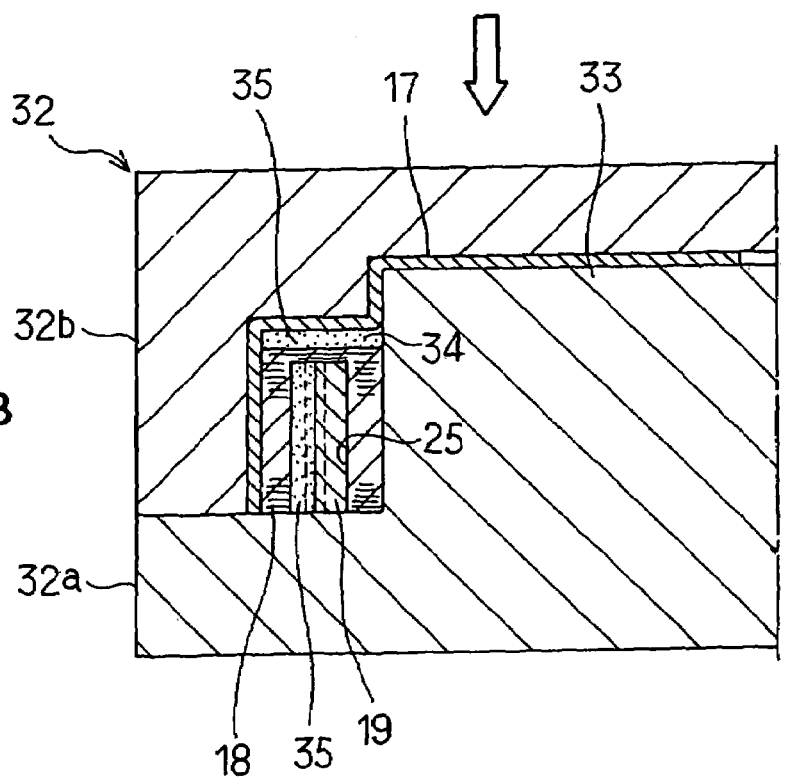

US 7,262,526 B2

ROTOR FOR PERMANENT MAGNET MOTOR OF OUTER ROTOR TYPE

BACKGROUND OF THE INVENTION

This is the U.S. National Stage of International Application No. PCT/JP03/07631, filed on Jun. 16, 2003, which relies for priority on Japanese Patent Applications Nos. 2002-179785. filed Jun. 20, 2002 and 2002-310967, filed Oct. 25, 2002, the contents of all of which are incorporated herein by reference in their entireties.

1. Field of the Invention

This invention relates to a rotor for a permanent magnet motor of the outer rotor type which includes a number of annularly arranged permanent magnets for formation of magnetic poles.

2. Description of the Related Art

FIGS. 18 and 19 illustrate a part of a rotor for a conventional permanent magnet motor of the outer rotor type in which a rotor is disposed around a stator. As shown, a rotor 10 comprises a frame 1 made from a magnetic material and including a disc-like main plate 1a and an annular circumferential wall 1b located around the main plate 1a, and a plurality of permanent magnets 2 arranged on an inner circumferential face of the wall 1b for the purpose of forming magnetic poles. A ring member 4 made from a magnetic material is disposed along an outer circumference of the wall 1b. The aforesaid frame 1, permanent magnets 2 and ring member 4 are integrally combined with one another by a synthetic resin 5. For example, Japanese Patent No. 3017953 discloses a rotor with the above-described construction.

The above-described rotor 10 is manufactured in the following method. A forming die 6 includes a lower die 6a and an upper die 6b as shown in FIG. 20A. The permanent magnets 2 are inserted into a recess 7 formed in the lower die 6a. The recess 7 is formed into an annular configuration according to a shape and the number of the permanent magnets 2. The frame 1 is then put over the permanent magnets 2 inserted in the recess 7, and the ring member 4 is further disposed along the outer circumference of the frame.

Subsequently, the upper die 6b is put onto the lower die 6a so that the forming die 6 is closed as shown in FIG. 20B. A cavity 8 defined between the upper and lower dies 6b and 6a is filled with a synthetic resin 5 in the molten state. When the synthetic resin 5 has been hardened, the upper die 6b is removed and the rotor 10 is taken from the lower die 6b. Thus, a number of permanent magnets 2 are integrally combined with the frame 1 by the synthetic resin in the annularly arranged state.

In the above-described rotor 10, however, the recess 7 needs to be provided in the lower die 6a in order that the permanent magnets 2 may be prevented from being displaced during filling the interior of the die 6 with the synthetic resin 5. Accordingly, the configuration of the lower die 6a is complicated.

SUMMARY OF THE INVENTION

Therefore, an object of the present invention is to provide a rotor for the permanent magnet motor of the outer rotor type which can simplify the configuration of the forming die.

The present invention provides a rotor for a permanent magnet motor of an outer rotor type, the rotor having a plurality of permanent magnets and disposed around a stator, the rotor comprising a frame, an annular iron core combined integrally with the frame, and a plurality of insertion holes formed in the core so that the permanent magnets are inserted in the insertion holes respectively, wherein the frame, the core and the permanent magnets are combined integrally with one another by a synthetic resin, and each insertion hole includes a magnet disposing portion in which the permanent magnet is disposed, a space portion located in at least one of circumferential both ends of each permanent magnet disposed in the magnet disposing portion, and a positioning portion positioning each permanent magnet in the magnet disposing portion, and the molten synthetic resin is poured into the space portion.

BRIEF DESCRIPTION OF THE DRAWINGS

FIG. 8A shows a step of disposing components of the rotor in a forming die;

FIG. 8B shows a step of pouring molten resin into the forming die;

DESCRIPTION OF THE INVENTION

Figure 1:
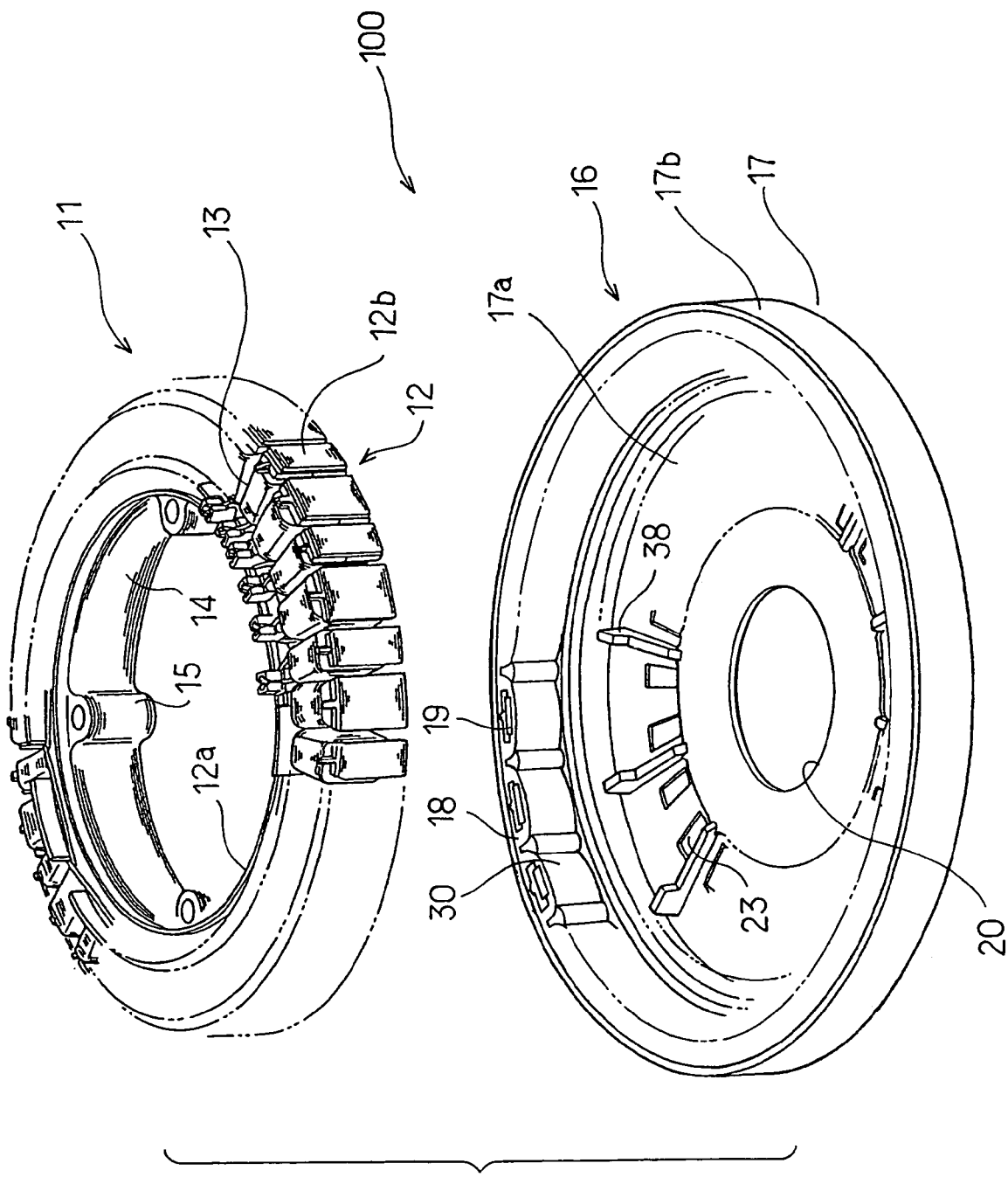
FIG. 1 is an exploded perspective view of a permanent magnet motor of the outer rotor type in accordance with a first embodiment of the present invention.
Figure 2:
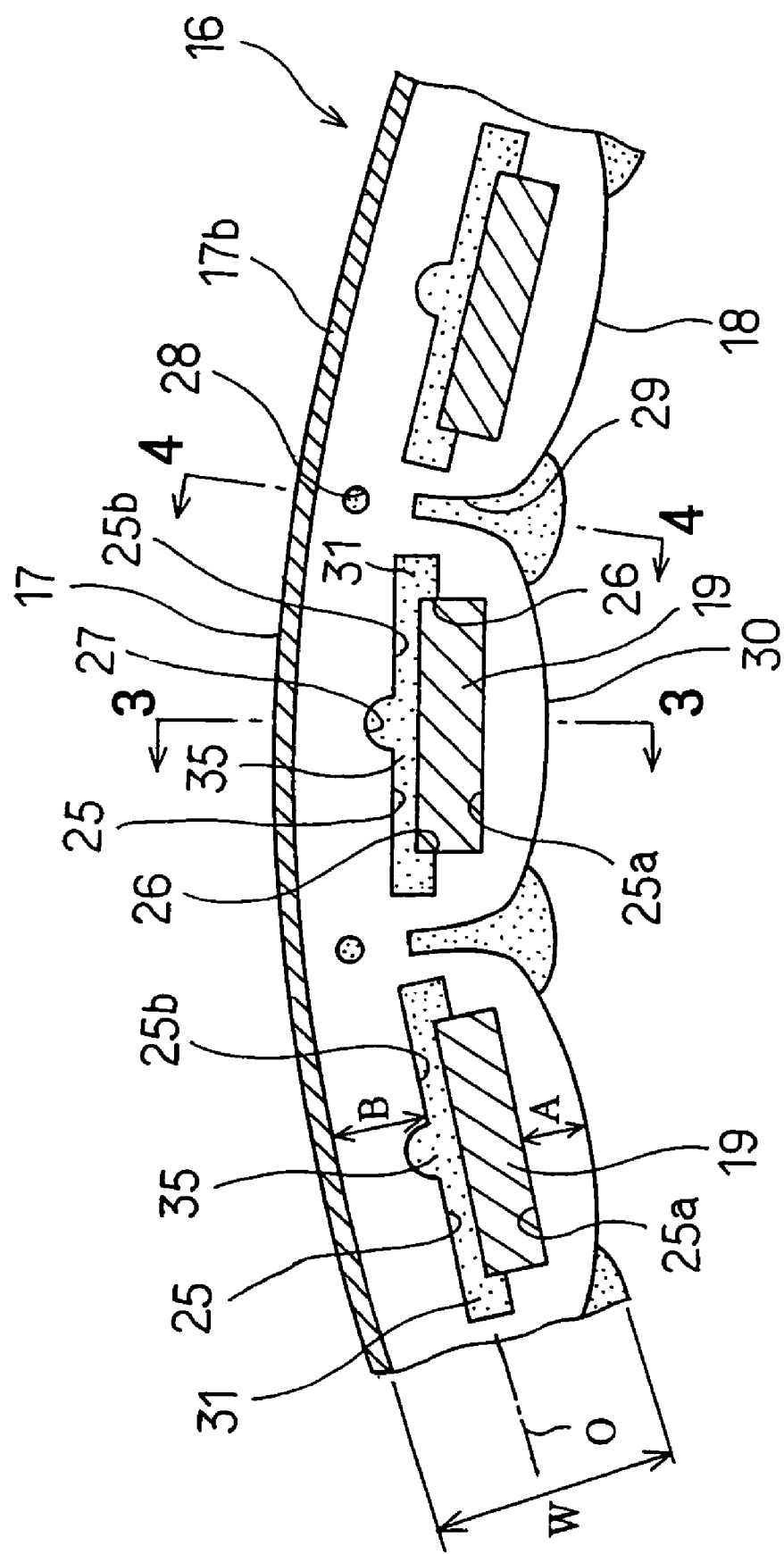
FIG. 2 is an enlarged cross-sectional view of a part of the rotor.
Figure 3:
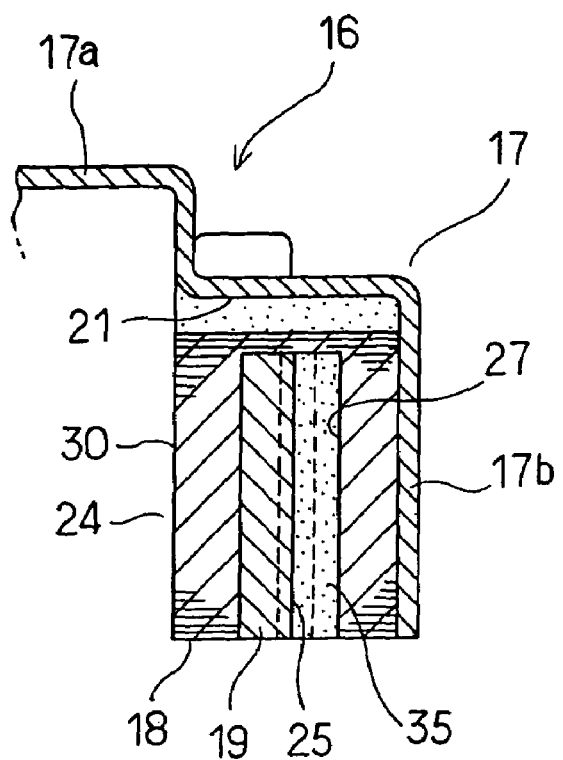
FIG. 3 is a longitudinal section of the rotor taken along line 3—3 in FIG. 2.
Figure 4:
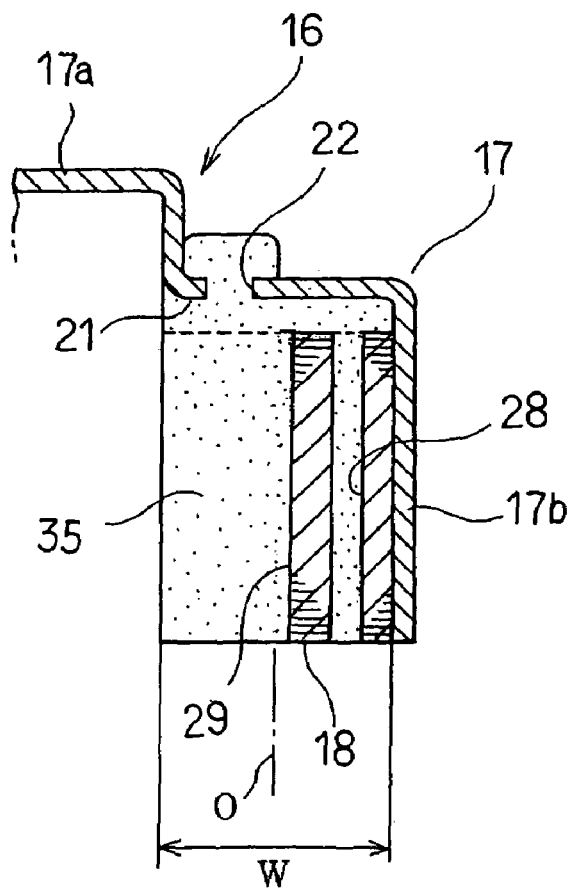
FIG. 4 is a longitudinal section of the rotor taken along line 4—4 in FIG. 2.

A first embodiment of the present invention will be described with reference to FIGS. 1 to 8. Referring to FIG. 1, a permanent magnet motor 100 of the outer rotor type is shown. The motor 100 comprises a stator 11 and a rotor 16. The motor 100 is mounted, for example, on a rear wall of a water tub constituting a washing machine to direct drive a rotating tub.

The stator 11 includes an annular yoke 12a and a stator core 12 having a number of teeth 12b projecting radially outward from an outer circumference of the yoke 12a. The stator core 12 is made, for example, by laminating a number of silicon steel sheets stamped out into a predetermined configuration. A covering member 14 made of an insulating resin is provided substantially over entire outer faces of the yoke 12a and teeth 12b by means of molding. A plurality of mounting portions 15 are provided integrally on the covering member 14 so as to be located on an inner circumference of the yoke 12a. The mounting portions 15 are used for mounting the stator 11 on a rear wall (not shown) of a water tub of a washing machine. A coil 13 is wound on the covering member 14 covering each tooth 12b. Thus, the stator 11 is constructed as described above. On the other hand, the rotor 16 includes a frame 17 and a rotor core 18 both formed integrally from a synthetic resin 35 (see FIGS. 2 to 4).

The frame 17 is made by pressing a magnetic material such as steel sheet into the shape of a bottomed flat cylinder. The frame 17 includes a main sheet portion 17a having a central shaft-supporting mounting hole 20 and an annular wall 17b standing at an outer circumferential edge of the main sheet portion 17a. A shaft support (not shown) supporting a rotational shaft is adapted to be mounted in the mounting hole 20. The rotational shaft is rotatably mounted on bearings (not shown) A stepped portion 21 is provided along an overall outer circumference of the main sheet portion 17a. The rotor core 18 is disposed in a space defined by the stepped portion 21 and an annular wall 17b. In this case, inner circumferential faces of the rotor core 18 and stepped portion 21 are rendered substantially coplanar. The stepped portion 21 has a plurality of through holes 22 formed along an overall circumference thereof. The main sheet portion 17a has a number of vent holes 23 which are formed in a portion thereof between the mounting hole 20 and the stepped portion 21 so as to be arranged radially about the mounting hole.

The rotor core 18 is made by laminating a large number of sheets of annularly punched magnetic material such as steel sheets. The rotor core 18 has a number of insertion holes 25 formed therein. Permanent magnets 19 for forming magnetic poles are provided in the insertion holes 25 respectively. A plurality of steel sheets composing an upper end of a laminate of steel sheets have no insertion holes 25. Accordingly, the insertion holes 25 are open at a lower end of the rotor core 18 but are closed at the upper end of the rotor core.

Each insertion hole 25 includes a rectangular narrow portion 25a extending tangentially with respect to the core 18 and a wide portion 25b. The wide portion 25b is located at the outer circumferential side of the core 18 and has a recess 27 formed at a central outer circumferential portion thereof and having a generally semicircular section. Distance B from the wide portion 25b to the outer circumference of the core 18 is set to be longer than distance A from the narrow portion 25a to an inner circumference of the core 18.

Each permanent magnet 19 is formed into the shape of a rectangular plate and has a length that is substantially the same as a circumferential length of the narrow portion 25a. Each permanent magnet 19 occupies an overall narrow portion 25a and a part of the wide portion 25b. Accordingly, both circumferential ends and an outer circumferential portion of each wide portion 25b have a space where no permanent magnet 19 is located. In the embodiment, the aforesaid overall narrow portion 25a and part of the wide portion 25b serve as a magnet location. A stepped portion 26 between the narrow and wide portions 25a and 25b serves as a positioning portion. Each employed permanent magnet 19 is of a high energy product type having a magnetic force not less than 2370 MA/m. Each permanent magnet 19 is magnetized in the direction of thickness thereof.

The rotor core 18 has a plurality of arc convex portions 30 formed on an inner circumferential face thereof. Each arc convex portion 30 is formed so that radial dimensions thereof at both circumferential ends thereof are smaller than a radial dimension thereof at the center thereof. Each trough 29 is located at the outer circumferential side relative to a radial center O at a portion thereof where a maximum radial dimension is achieved. Furthermore, the rotor core 18 has a plurality of through holes 28 formed so as to be located at an outer circumferential side relative to the respective troughs 29 and so as to extend axially therethrough.

Referring now to FIGS. 8A and 8B, a method of manufacturing the rotor 18 is shown. A forming die comprises a lower die 32a and an upper die 32b. The lower die 32a includes a convex portion 33 in compliance with the shape of the rotor 16. More specifically, the rotor core 18 is disposed along an outer circumference of the convex portion 33 of the lower die 32a after the permanent magnet 19 has been inserted in the insertion hole 25. The frame 17 is then placed on the rotor core 18, and the upper die 32b is placed on the frame 17 so that the die is closed. Subsequently, a molten synthetic resin 35 is poured into a cavity 34 defined by the upper and lower dies 32b and 32a. Consequently, the molten synthetic resin fills the through holes 28, the wide portions 25b of the insertion holes 25, the recesses 27 and the troughs 29. That is, the through holes 28 serve as passages for the molten resin 35. Parts of the wide portions 25b where no permanent magnets 19 are provided also serve as passages for the molten resin 35. Additionally, the molten resin 35 penetrates through the holes 22 outside the frame 17.

Figure 5:
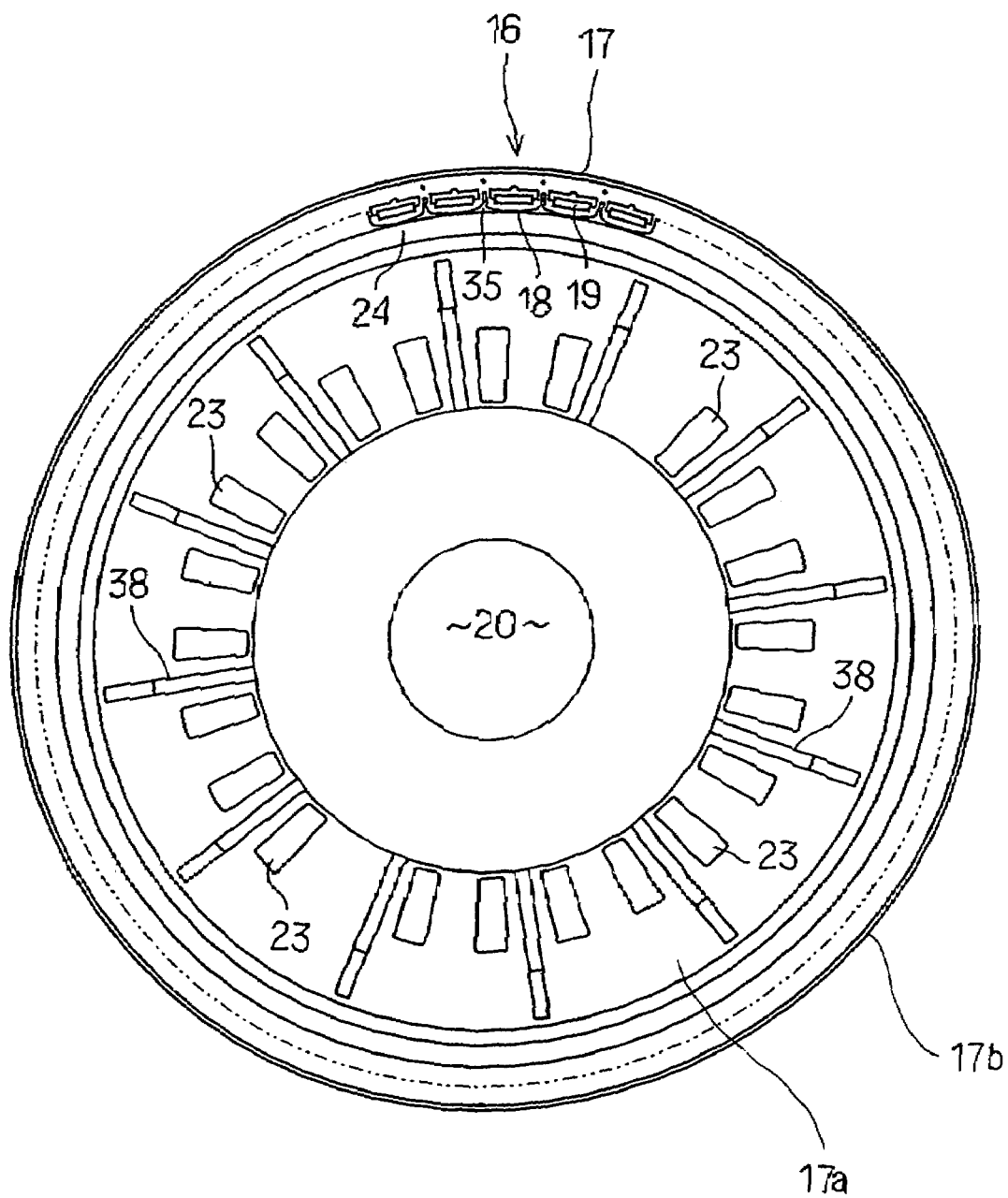
FIG. 5 is a plan view of the overall rotor.
Figure 6:
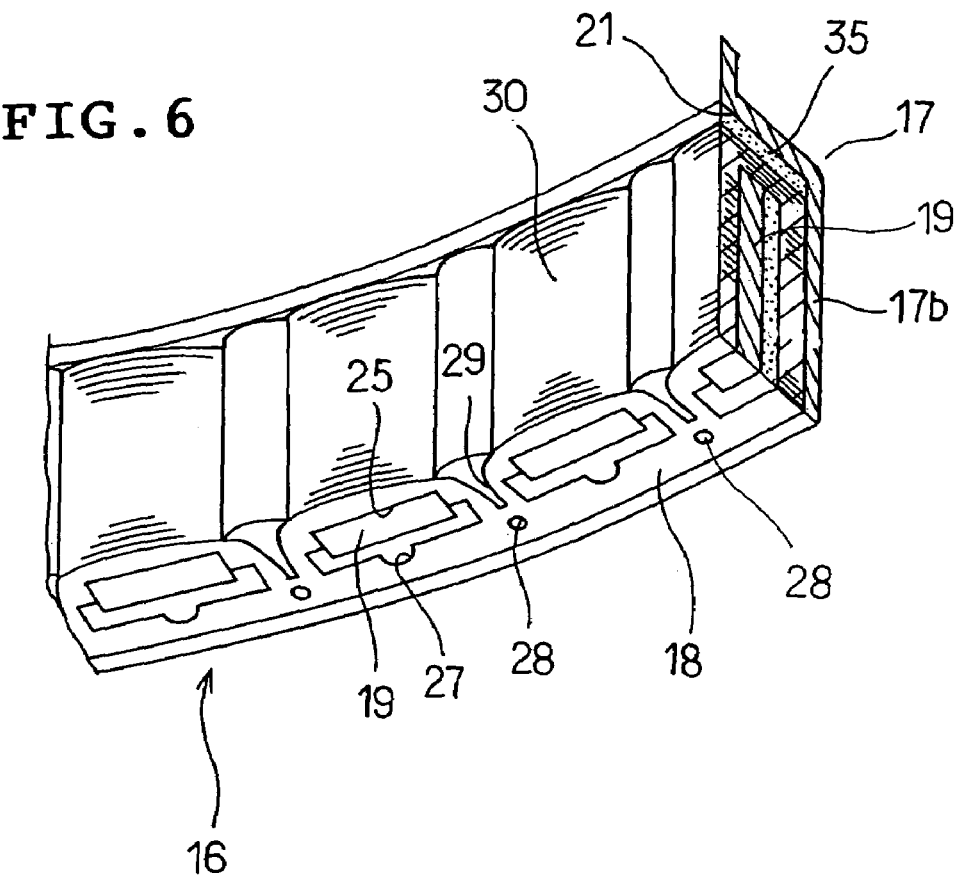
FIG. 6 is a perspective view of a part of the rotor.
Figure 7:
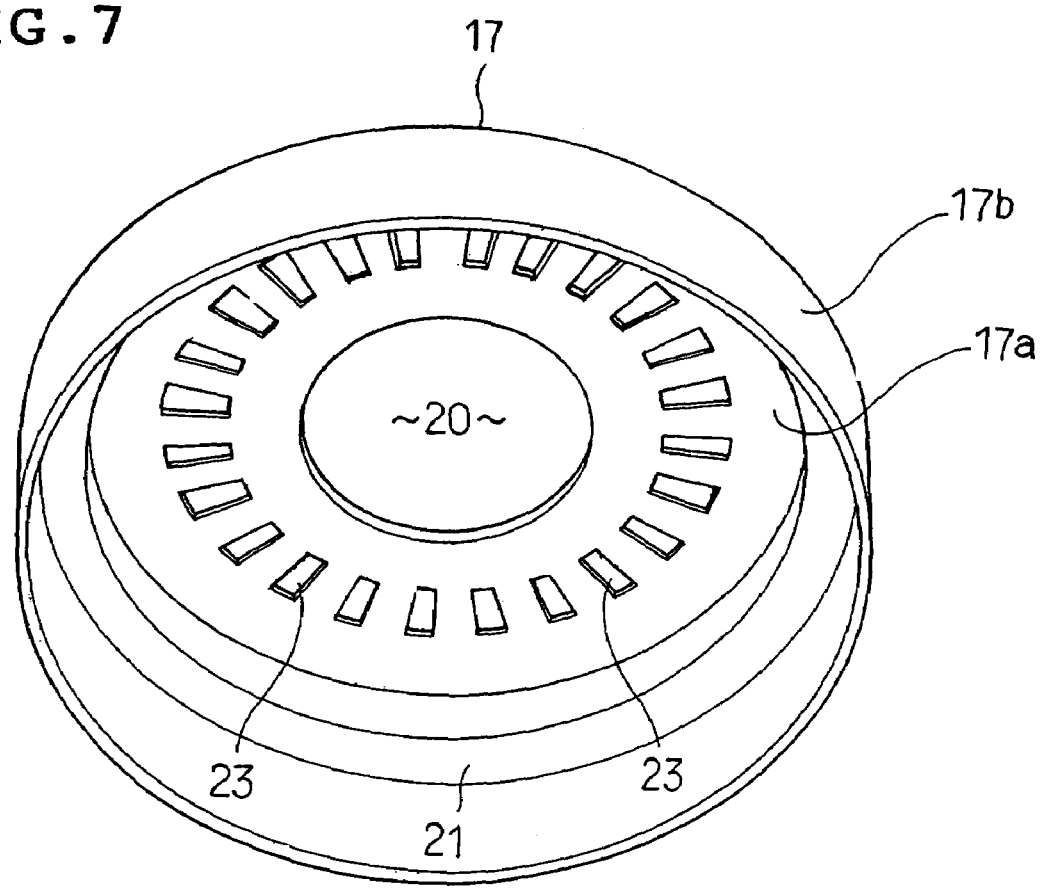
FIG. 7 is a perspective view of a frame.

Furthermore, the wide portion 25b and the recess 27 are filled with the molten resin 35 such that each permanent magnet 19 is put aside to the inner circumferential end face of the insertion hole 25. In other words, the permanent magnet 19 is positioned in the narrow portion 25a of the insertion hole 25. Additionally, the molten resin 35 is formed into a plurality of ribs radially extending around the mounting hole 20 of the frame 17 as shown in FIG. 5. The upper die 32b is then removed when the molten resin 35 has been hardened, and the rotor 16 is removed from the lower die 32a. Thus, the rotor 16 in which the frame 17, rotor core 18 and permanent magnets 19 are integrally combined together is made.

The permanent magnets 19 are inserted in the insertion holes 25 respectively in the foregoing embodiment. Accordingly, the forming die 32 requires no recesses to position the permanent magnets 19. Consequently, since the construction of the forming die is simplified, the cost of the product can be reduced. Furthermore, the convex portions 30 are formed on the inner circumferential face of the rotor core 18, and an air gap between the rotor core 18 and the stator 1 is gradually increased from the central portion of the magnetic pole toward both circumferential ends. Accordingly, the magnetic flux density between the stator and rotor cores 12 and 18 is gradually decreased from the central portion of the magnetic pole toward both circumferential ends, whereupon the distribution of magnetic flux density is approximated to a sinusoidal waveform. Consequently, the cogging torque can be reduced and accordingly, the motor characteristics can be improved and amounts of oscillation and noise can be reduced.

The troughs 29 are formed between the adjacent magnetic poles of the rotor core 18. Consequently, the magnetic flux flowing between the permanent magnets 19 can be prevented from shorting. In other words, the magnetic flux flowing between the permanent magnets 19 adjacent to each other can be caused to pass to the outer circumferential portion of the rotor core 18. Furthermore, the synthetic resin 35 fills the through holes 28 and the troughs 29. Accordingly, the frame 17, the rotor core 18 and the permanent magnets 19 are combined together more firmly. Moreover, the through holes 28 are formed in the outer circumferential side of the core 18. Accordingly, the flow of magnetic flux from the permanent magnets 19 to the stator 11 is not blocked and a reduction in the motor characteristics due to provision of the through holes 28 can be prevented.

Additionally, the distance B from each insertion hole 25 to the outer circumference of the core 18 is set to be longer than the distance A from each insertion hole 25 to the outer circumference of the core 18. Consequently, a sufficient passage for the magnetic flux can be ensured in the outer circumference of the core 18 and accordingly, the flow of magnetic flux between the adjacent permanent magnets 19 can be improved.

Figure 9:
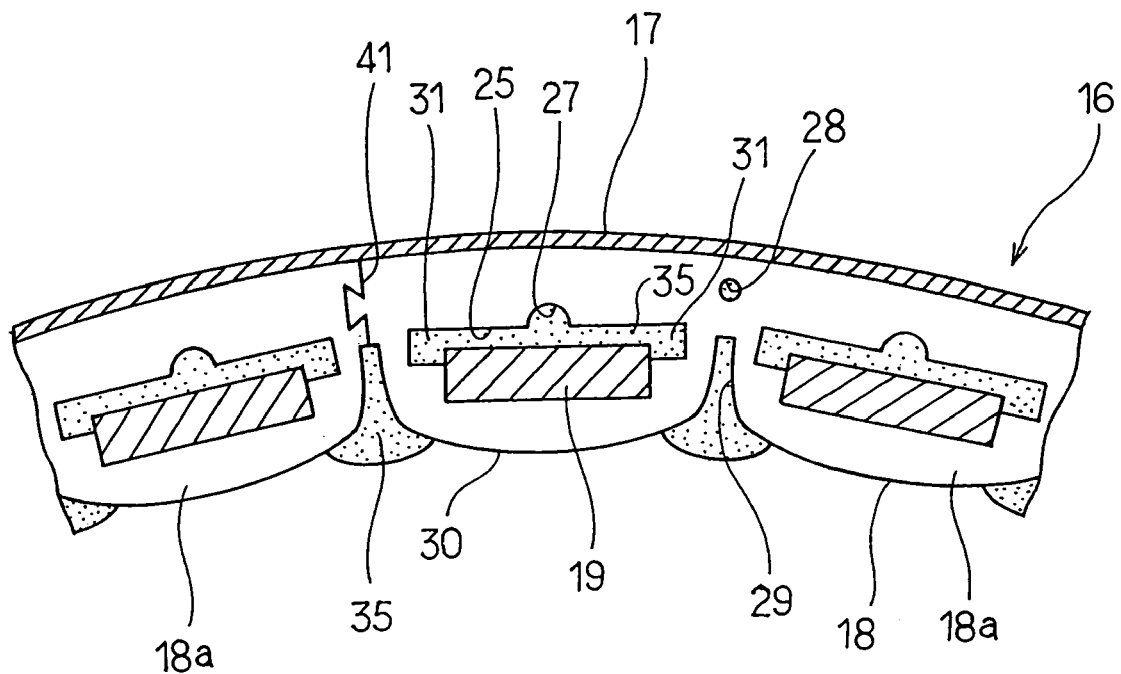
FIG. 9 is a view similar to FIG. 2, showing the rotor of the permanent magnet motor in accordance with a second embodiment of the present.
Figure 10:
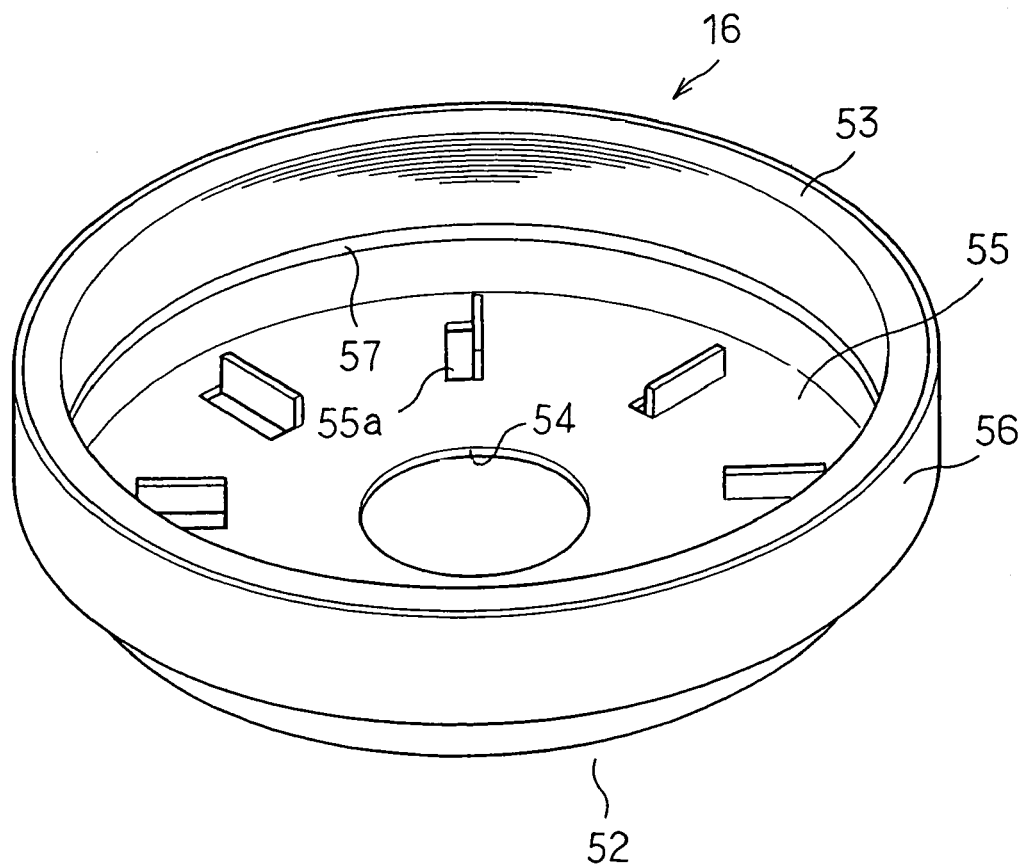
FIG. 10 is a perspective view of the overall rotor in accordance with a third embodiment of the present invention.
Figure 11:
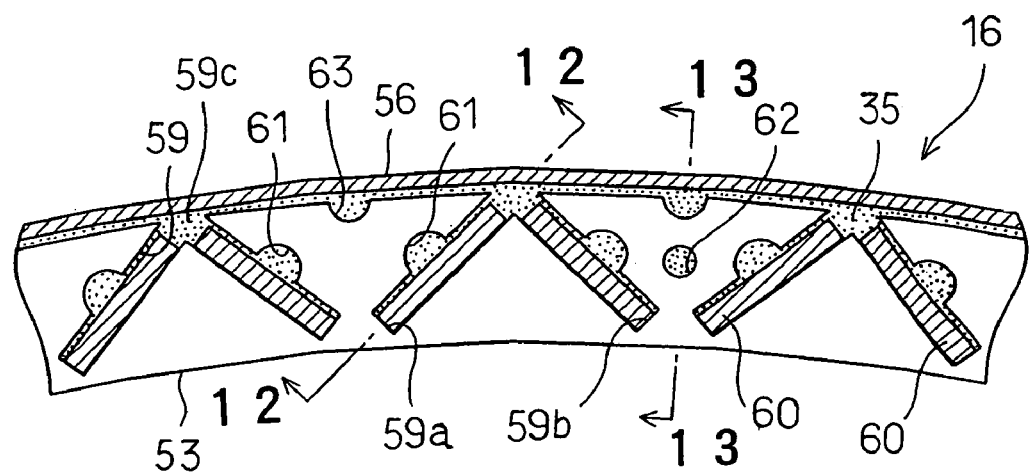
FIG. 11 is a view similar to FIG. 2.
Figure 12:
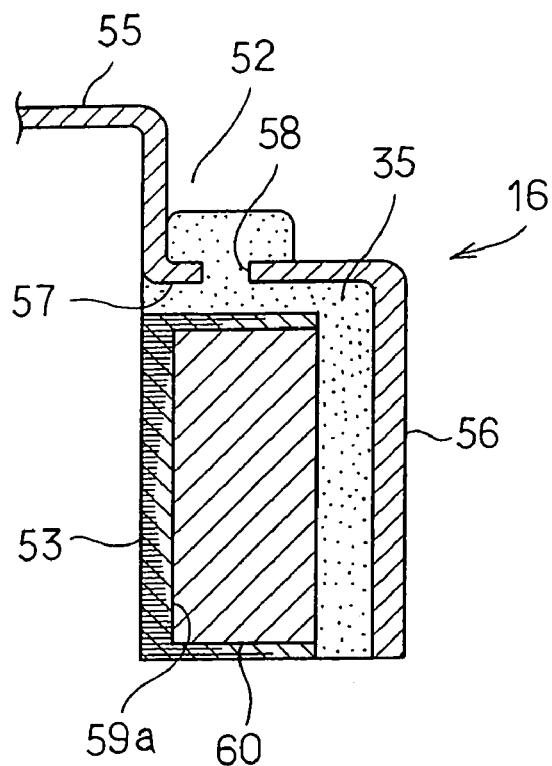
FIG. 12 is a longitudinal section of the rotor taken along line 12—12 in FIG. 11.
Figure 13:
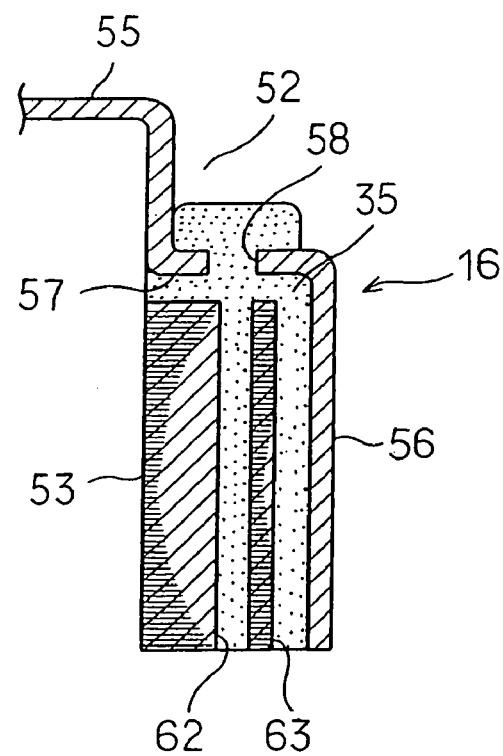
FIG. 13 is a longitudinal section of the rotor taken along line 13—13 in FIG. 11.

FIG. 9 illustrates a second embodiment of the invention. Only the difference of the second embodiment from the previous one will be described. Identical or similar parts in the second embodiment are labeled by the same reference symbols as those in the first embodiment, and the description of these parts will be eliminated. In the second embodiment, the rotor core 18 comprises a plurality of unit cores 18a connected one to another into an annular configuration.

The magnetic force is reduced since the magnetic resistance is increased at connected portions 41 of each unit core 18a. Accordingly, the rotational speed of the rotor 16 is reduced near the connected portions 41 in the construction of feedback control of the motor. A current value and a voltage value are increased so that the rotational speed of the rotor is increased. Thus, in the above-described arrangement, a rotational position of the rotor 16 can be detected by measuring the current and voltage values.

Additionally, a material for the core 18 can efficiently be used.

FIGS. 10 to 14 illustrate a third embodiment of the invention. Only the difference of the third embodiment from the first embodiment will be described. The rotor 16 of the second embodiment includes a frame 52 and a rotor core 53 both integrated by molding. The frame 52 is made by pressing a magnetic material such as a steel sheet into the shape of a bottomed flat cylinder. The frame 52 includes a main sheet portion 55 having a central shaft-supporting mounting hole 54 and an annular wall 56 standing at an outer circumferential edge of the main sheet portion 55.

A stepped portion 57 is provided along an overall outer circumference of the main sheet portion 55. The rotor core 53 is disposed in a space defined by the stepped portion 57 and an annular wall 56. In this case, inner circumferential faces of the rotor core 53 and stepped portion 57 are rendered substantially coplanar. The stepped portion 57 has a plurality of through holes 58 formed along an overall circumference thereof. The main sheet portion 55 has a number of vent holes 55a which are formed in a portion near the inner circumference thereof by cutting and raising so as to be arranged radially about the mounting hole 12.

The rotor core 53 is made by laminating a large number of sheets of annularly punched magnetic material such as steel sheets. The rotor core 53 has a number of generally V-shaped insertion holes 59 formed therein. Pairs of permanent magnets 60 for forming magnetic poles are provided in the insertion holes 59 respectively. Each pair of permanent magnets 60 constitute magnetic poles in the embodiment.

Each insertion hole 59 has a central bent portion located at the outer circumferential side of the rotor core 53 and both circumferential ends located at the inner circumferential side of the rotor core. Each insertion hole 59 is open at the outer circumferential face of the rotor core 53. Of the laminated steel sheets composing the rotor core 53, one or a plurality of steel sheets located at both axial ends have no insertion holes 59. Accordingly, both axial ends of each insertion hole 59 are closed.

Each permanent magnet 60 has the shape of a rectangular flat plate. Each pair of permanent magnets 60 are contained in a storage section 59a extending from the bent portion to one end of the insertion hole 59 and a storage section 59b extending from the bent portion to the other end of the insertion hole respectively. Each storage section 59a or 59b has a recess 61 formed in a central outer periphery so as to extend full axial length of the rotor core 53 and having a generally semicircular section. The permanent magnets 60 are inserted through an opening 59c of each insertion hole 59 into the storage sections 59a and 59b at the outer circumferential face of the rotor core 53 respectively. In this case, the recesses 61 are not occupied by the permanent magnets 60 and accordingly serve as spaces.

Each employed permanent magnet 60 is of a high energy product type having a magnetic force not less than 316 MA/m. Each permanent magnet 60 is magnetized in the direction of thickness thereof. Each pair of magnets 60 are contained in the storage sections 59a and 59b so that inner circumferential side faces thereof have the same polarity. Furthermore, the rotor core 53 has axially extending circular through holes 62 located between the insertion holes 59 adjacent to each other. The rotor core 53 further has semicircular notches 63 which are formed in the outer circumferential face thereof so as to be located between the insertion holes 59 adjacent to each other.

In forming the rotor 16, molten resin 35 is poured into the space between the annular wall 56 and stepped portion 57 of the frame 52 and the rotor core 53 and hardened so that the frame and the rotor core are integrated. In this case, the synthetic resin 35 flows through the holes 58 to be located outside the frame 52. Furthermore, the molten resin 35 also fills the through holes 62 and the notches 63. Thus, the rotor core 53 is firmly fixed to the frame 52.

The molten resin 35 further flows through the openings 59c into the insertion holes 59, whereupon the permanent magnets 60 are pushed against the inner peripheral ends of the storage sections 59a and 59b thereby to be positioned. The resin 35 having flown into each insertion hole 59 further flows through gaps between the permanent magnets 60 and the storage sections 59a and 59b into the recesses 61, whereupon the permanent magnets 60 are pushed against the inner faces of the storage sections 59a and 59b located opposite the recesses 61 respectively thereby to be positioned. Thus, in the embodiment, a portion of each storage section 59a or 59b except a portion filled with the resin 35 serves as a magnet disposing portion.

Figure 14:
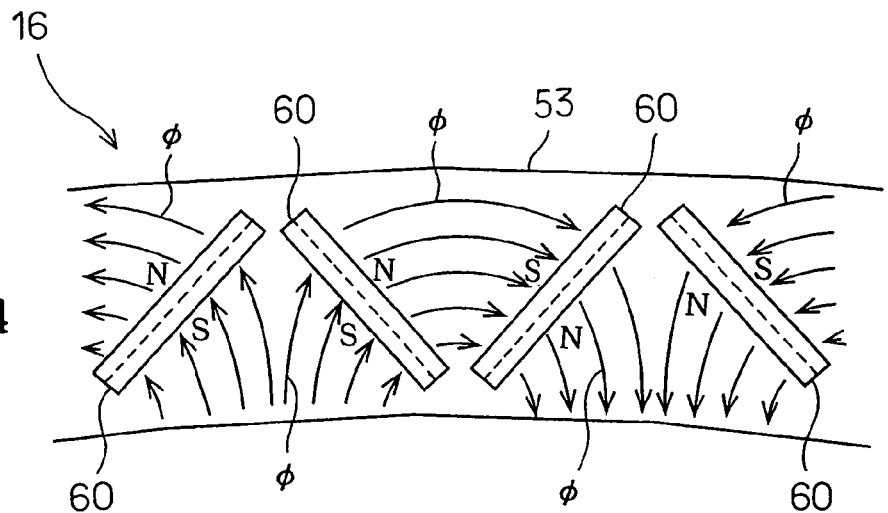
FIG. 14 is a view explaining the magnetic flux distribution.

The operation of the foregoing rotor will now be described with reference to FIG. 14 illustrating magnetic flux emerging from and re-entering the permanent magnets 60. The inner circumferential side (stator side) of the rotor core 53 is shown as the lower side as viewed in FIG. 13.

Since the permanent magnets 60 are disposed so as to obliquely cross the interior of the rotor core 53 in the embodiment, the direction of magnetic flux Φ emerging from and re-entering the permanent magnets 60 is inclined circumferentially. As a result, since a path of magnetic flux re-flowing between the adjacent magnetic poles is mainly established inside the rotor core 53, no magnetic path need be established in the annular wall 56 of the frame 52. Accordingly, the thickness of the annular wall 56 is enough to ensure the mechanical strength required to support the rotor core 53. Thus, the thickness of the annular wall 56 can be reduced as compared with the prior art and accordingly, the weight of the rotor can be reduced.

Furthermore, magnetic flux Φ flowing in the inner circumferential side of the rotor core 53 relative to the permanent magnets 60 is directed to the central magnetic pole. Accordingly, the magnetic flux density becomes higher in the central portion than in the ends. Consequently, since the magnetic flux density distribution in a core gap approximates to a sinusoidal waveform, the motor characteristics can be improved with reduction in the cogging torque.

In the third embodiment, the V-shaped insertion holes 59 are formed in the rotor core 53, and two permanent magnets 60 constituting the magnetic poles are contained in each insertion hole 59. The magnetic direction of each magnet 60 is inclined circumferentially. Accordingly, since the annular wall 56 of the frame 52 need not serve as a back yoke, the thickness of the annular wall 56 can be reduced accordingly. Furthermore, two permanent magnets 60 are contained in the storage section 59a at one circumferential side and the storage section 59b at the other circumferential side of each insertion hole 59 respectively. Accordingly, no permanent magnet is located at a circumferentially central portion of each insertion hole 59 where the magnetic direction is radial. Consequently, the thickness of the frame 52 can further be reduced.

It is considered that a radial dimension of the rotor core 53 could be reduced by employment of an anisotropic permanent magnet (plastic magnet) in which the magnetic direction is a circumferential direction. However, the production cost of an anisotropic permanent magnet is disadvantageously high. In the third embodiment, the ordinary rectangular permanent magnets 60 are employed and accordingly, an increase in the production cost can be prevented. Furthermore, the rotor core 53 comprises a laminated iron core. Consequently, energy loss can be reduced.

Furthermore, the frame 52 and the rotor core 53 are integrated by the synthetic resin 35. In particular, the through holes 62 and the notches 63 are formed in the rotor core 53 in the embodiment. These holes 62 and notches 63 are filled with the synthetic resin 35. As a result, the frame 52 and the rotor core 53 can be integrated firmly. In this case, since the through holes 62 and the notches 63 are located at the outer circumferential side relative to the permanent magnets 60, the motor characteristics can be prevented from being adversely affected. Additionally, each insertion hole 59 is open at the outer circumferential face of the rotor core 53, whereas the upper and lower ends of each insertion hole 59 are closed. Consequently, each permanent magnet can be prevented from being axially moved.

Figure 15:
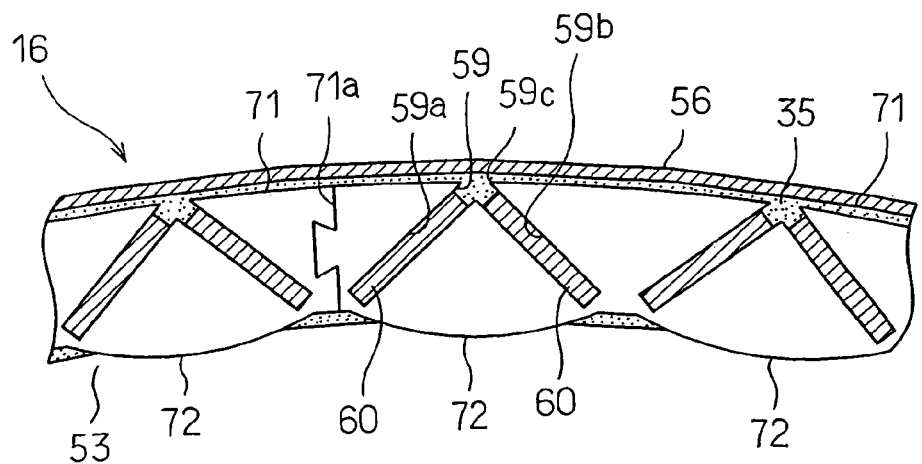
FIG. 15 is a view similar to FIG. 10, showing a fourth embodiment of the present invention.

FIG. 15 illustrates a fourth embodiment of the invention. Only the difference of the fourth embodiment from the third embodiment will be described. The rotor core 53 comprises a plurality of unit cores 71 which are connected into an annular configuration. Each unit core 71 corresponds to a divided part of the core 53 including a plurality of magnetic poles. The unit cores 71 are connected to one another so that a connection 71a of the adjacent unit cores 71 is located between the magnetic poles as shown in FIG. 15. Consequently, the material for the core 53 can efficiently be used. Moreover, since the connection 71a is located between the magnetic poles, the magnetic flux density distribution can be prevented from being adversely affected.

The rotor core 53 has a plurality of arc convex portions 30 formed on an inner circumferential face thereof except both circumferential ends of each magnetic pole. Each arc convex portion 72 is formed so that radial dimensions thereof at both circumferential ends thereof are smaller than a radial dimension thereof at the center thereof. The configuration, arrangement and dimensions of each convex portion 72 are set so that the air-gap magnetic flux density distribution is rendered substantially sinusoidal. The configuration, arrangement and dimensions of each convex portion 72 were obtained from experiments carried out by the inventors. The above-described construction can improve the motor characteristics.

Furthermore, each storage section 59a and 59b has a width substantially equal to or smaller than the thickness of the permanent magnet 60, and the permanent magnets 60 are fitted into the storage sections 59a and 59b. Accordingly, no recesses 61 are formed in the outer periphery of each storage section 59a and 59b in the embodiment. Additionally, the rotor core 53 has no through holes 62 and no notches 63 in the embodiment. When the frame 52 and the rotor core 53 are integrated, the synthetic resin 35 fills each section of the inner circumferential face of the rotor core 53 between adjacent convex portions 72. Accordingly, the rotor core 53 can be fixed to the frame 52 firmly even when the through holes 62 and the notches 63 are eliminated. Moreover, the inner circumferential face of the rotor core 53 can be smoothed since the synthetic resin 35 fills each section of the inner circumferential face of the rotor core 53 between adjacent convex portions 72. Accordingly, an increase in the noise due to rotation of the rotor 51 can be prevented by provision of the convex portions 72 on the inner circumferential face of the core 53.

Figure 16:
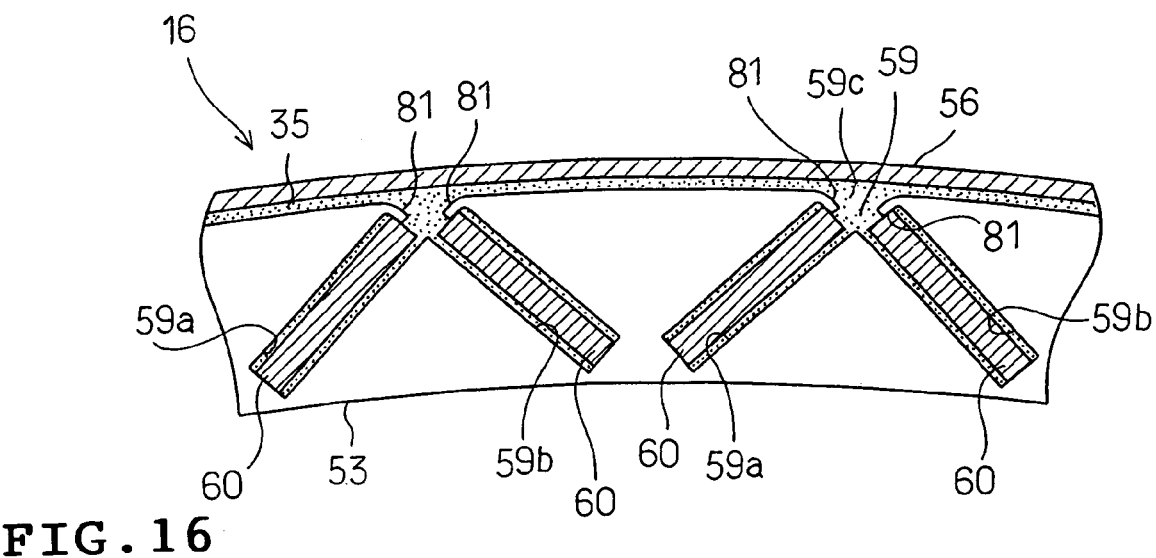
FIG. 16 is a view similar to FIG. 10, showing a fifth embodiment of the present invention.

FIG. 16 illustrates a fifth embodiment of the invention. Only the difference of the fifth embodiment from the first embodiment will be described. In the fifth embodiment, protrusions 81 are provided near the opening 59c of each insertion hole 59 so as to correspond to the storage sections 59a and 59b respectively. The protrusions 81 protrude to the outer circumferential side before insertion of the permanent magnets into the respective storage sections 59a and 59b. After the magnets have been inserted in the respective storage sections 59a and 59b, the protrusions 81 are bent thereby to depress the permanent magnets 60 to the inner circumferential side. In this construction, too, the permanent magnets 60 can be positioned in the respective storage sections 59a and 59b.

Figure 17:
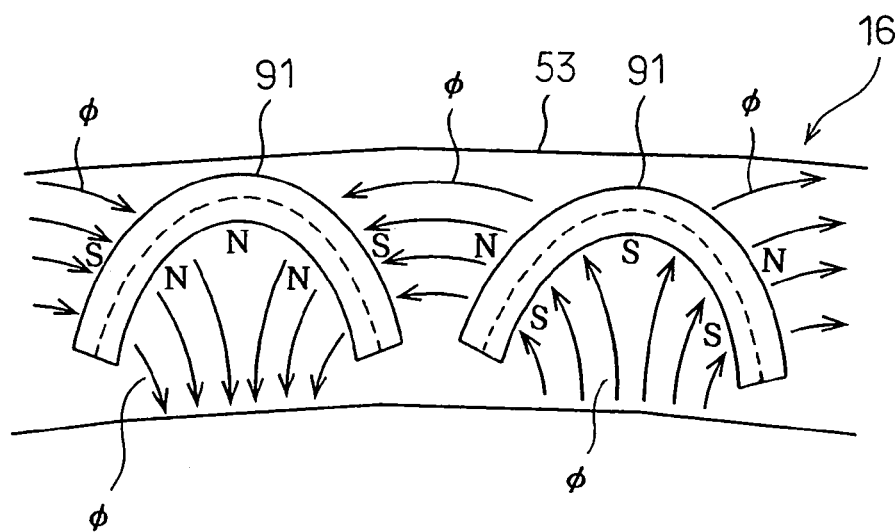
FIG. 17 is a view similar to FIG. 14, showing a sixth embodiment of the present invention.
Figure 18:
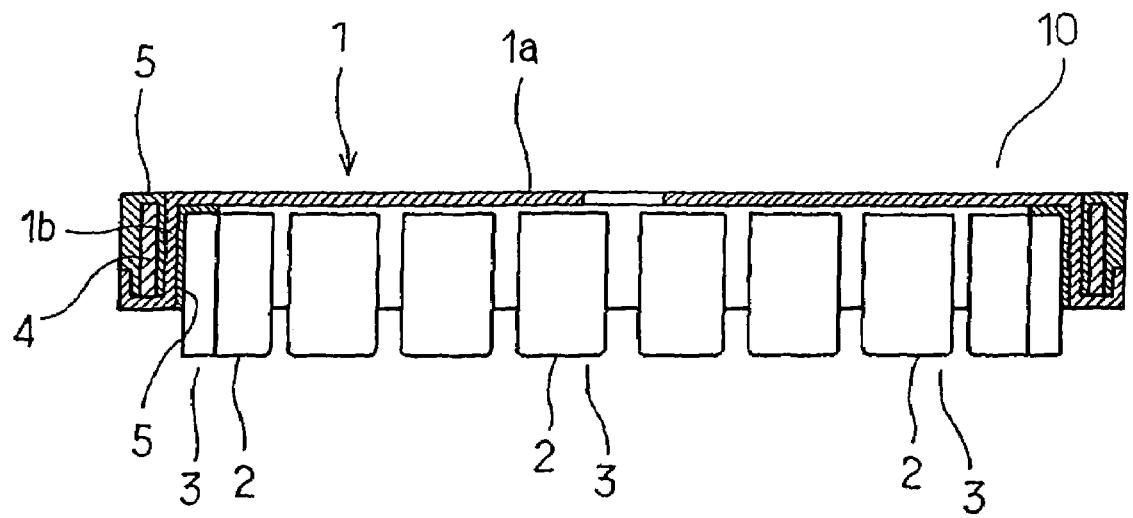
FIG. 18 is a longitudinal section of a part of the rotor of a conventional permanent magnet motor of the outer rotor type.
Figure 19:
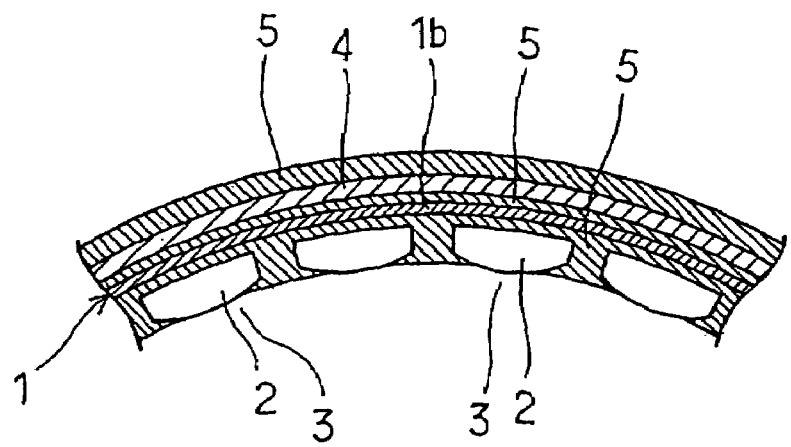
FIG. 19 is a cross-sectional view of a part of the rotor.
Figure 20A:
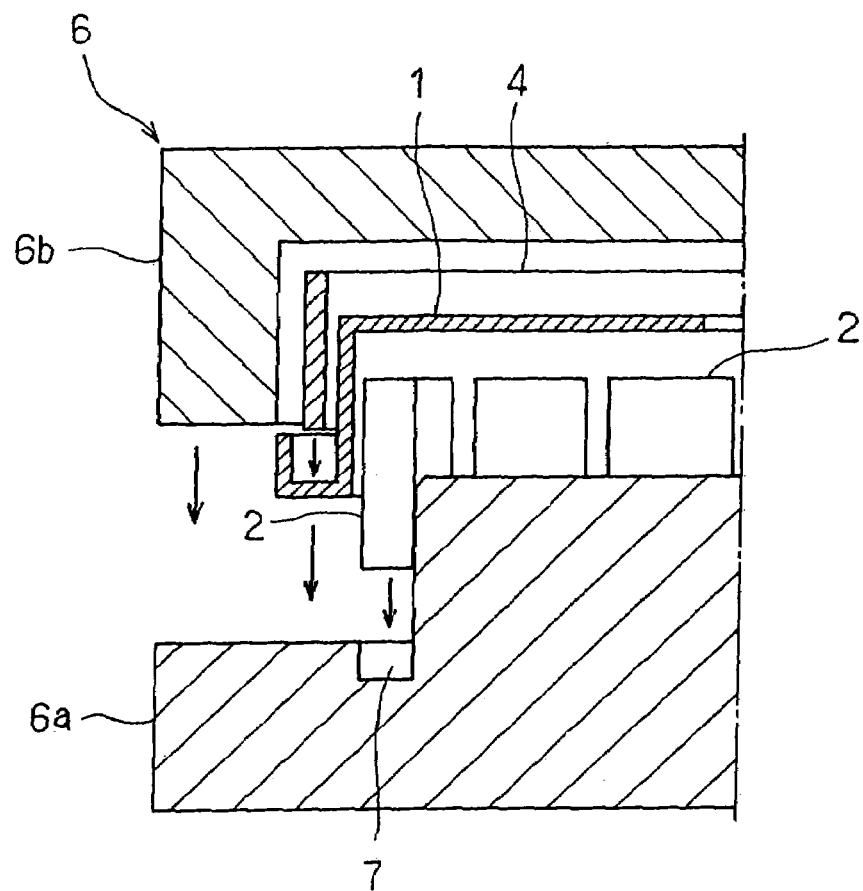
FIG. 20A is a view similar to FIG. 8A.
Figure 20B:
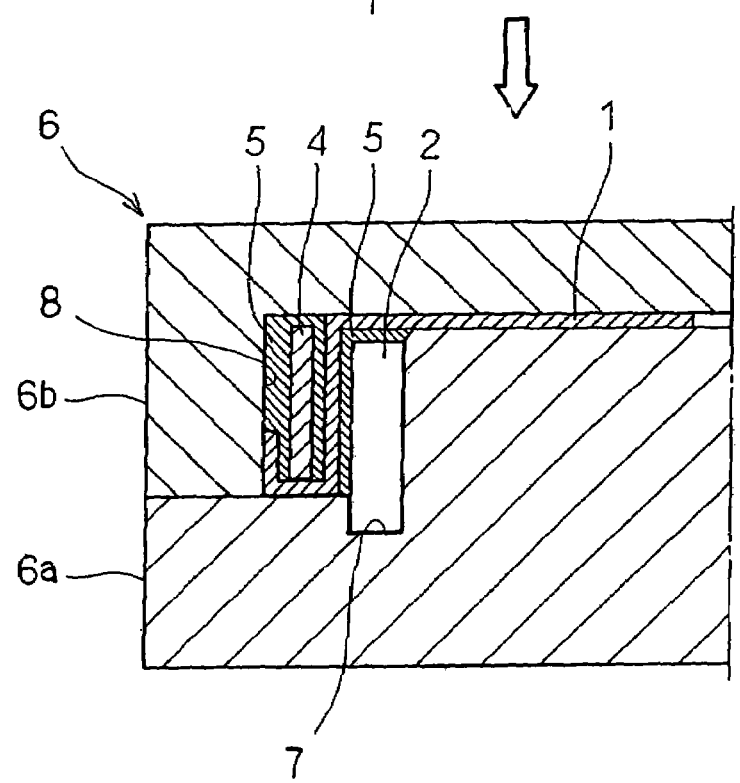
FIG. 20B is a view similar to FIG. 8B.

Each permanent magnet 60 is formed into the rectangular plate shape in the foregoing embodiments. As shown as a sixth embodiment in FIG. 17, however, a plurality of permanent magnets 91 each formed into the shape of a generally arc plate may be used, instead. In this case, each one permanent magnet 91 establishes one magnetic pole. In this embodiment, too, the thickness of the frame 52 can be reduced since the magnetic direction of each permanent magnet 51 is inclined circumferentially.

In the third to fifth embodiments, the frame need not be provided with a function as the back yoke. Accordingly, the frame may be made of plastic. Consequently, the weight of the rotor can further be reduced.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

The invention claimed is:

1. A rotor for a permanent magnet motor of an outer rotor type, the rotor having a plurality of permanent magnets and disposed around a stator, the rotor comprising:
a frame;
an annular iron core combined integrally with the frame; and
a plurality of insertion holes formed in the core so that the permanent magnets are inserted in the insertion holes respectively,
wherein the frame, the core and the permanent magnets are combined integrally with one another by a synthetic resin, and each insertion hole includes a magnet disposing portion in which the permanent magnet is disposed, a space portion located in at least one of circumferential both ends of each permanent magnet disposed in the magnet disposing portion, and a positioning portion positioning each permanent magnet in the magnet disposing portion, and the molten synthetic resin is poured into the space portion.

2. A rotor for a permanent magnet motor of an outer rotor type, the rotor having a plurality of permanent magnets and disposed around a stator, the rotor comprising:
a frame;
an annular iron core combined integrally with the frame; and
a plurality of insertion holes formed in the core so that the permanent magnets are inserted in the insertion holes respectively,
wherein the frame, the core and the permanent magnets are combined integrally with each other by a synthetic resin, and each insertion hole includes a magnet disposing portion in which the permanent magnet is disposed and a recess defining a space along an outer periphery of each permanent magnet disposed in the magnet disposing portion, and the molten synthetic resin is poured into the recess.

3. A rotor for a permanent magnet motor of an outer rotor type, the rotor having a plurality of permanent magnets and disposed around a stator, the rotor comprising:
a frame;
an annular iron core combined integrally with the frame; and
a plurality of insertion holes formed in the core so that the permanent magnets are inserted in the insertion holes respectively,
wherein the frame, the core and the permanent magnets are combined integrally with each other by a synthetic resin;
the core has a through hole from which a molten synthetic resin is poured; and
a distance from the through hole to the outer circumference of the core is shorter than a distance from a axial center in a portion of the core where the core has a maximum axial dimension, to the outer circumference of the core.

4. A rotor for a permanent magnet motor of an outer rotor type, the rotor having a plurality of permanent magnets and disposed around a stator, the rotor comprising:
a frame;
an annular iron core combined integrally with the frame; and
a plurality of insertion holes formed in the core so that the permanent magnets are inserted in the insertion holes respectively,
wherein the frame, the core and the permanent magnets are combined integrally with each other by a synthetic resin;
the core has a through hole from which a molten synthetic resin is poured; and
the through hole is formed nearer to the outer circumference of the core than the permenent magnets in the core.

5. A rotor for a permanent magnet motor of an outer rotor type, the rotor having a plurality of permanent magnets and disposed around a stator, the rotor comprising:
a frame;
an annular iron core combined integrally with the frame; and
a plurality of insertion holes formed in the core so that the permanent magnets are inserted in the insertion holes respectively,
wherein the frame, the core and the permanent magnets are combined integrally with each other by a synthetic resin;
the core has a through hole from which a molten synthetic resin is poured; and
the through hole is formed in the core so as to be located between the magnetic poles.

6. A rotor for a permanent magnet motor of an outer rotor type, the rotor having a plurality of permanent magnets and disposed around a stator, the rotor comprising:
a frame;
an annular iron core combined integrally with the frame;
a plurality of insertion holes formed in the core so that the permanent magnets are inserted in the insertion holes respectively, and
a plurality of trough portions formed in the core so as to be located between the respective insertion holes adjacent to each other in the inner circumferential portion thereof, the trough portions being filled with a synthetic resin.

7. The rotor according to claim 6, wherein a distance between an outer circumferential end of each trough portion and an outer circumferential portion of the core is smaller than a distance between a radial center of the core and the outer circumferential end of the core.

* * * * *